United States Patent [19]

Gibbemeyer

[11] 4,082,175

[45] Apr. 4, 1978

[54] CONVEYOR COMBINED WITH COUPLING

[75] Inventor: Joseph Franz Gibbemeyer, Cincinnati, Ohio

[73] Assignee: Cincinnati Milacron Inc., Cincinnati, Ohio

[21] Appl. No.: 796,846

[22] Filed: May 17, 1977

Related U.S. Application Data

[63] Continuation-in-part of Ser. No. 668,323, Mar. 18, 1976, abandoned.

[51] Int. Cl.² ............................................. B65G 47/90
[52] U.S. Cl. ................................... 198/377; 198/651; 198/694
[58] Field of Search ............... 198/377, 378, 477, 479, 198/482, 486, 651, 653, 678, 694, 695, 696, 344; 214/1 BA; 294/93, 94, 96, 86.24, 86.25

[56] References Cited

U.S. PATENT DOCUMENTS

| | | | |
|---|---|---|---|
| 2,282,767 | 5/1942 | Peterson | 294/93 |
| 2,661,979 | 12/1953 | Stone | 294/96 |
| 2,670,797 | 3/1954 | Armentrout | 294/96 |
| 2,824,577 | 2/1958 | Grunsky | 294/96 |
| 3,067,861 | 12/1962 | Johnson | 198/651 |
| 3,083,813 | 4/1963 | Lusher | 198/651 |
| 3,314,714 | 4/1967 | Brubaker | 294/93 |
| 3,751,932 | 8/1973 | Matthews, Jr. | 294/93 |
| 3,765,533 | 10/1973 | Stephens et al. | 198/378 |
| 3,794,369 | 2/1974 | Hnatko | 294/96 |
| 3,958,685 | 5/1976 | McDonald et al. | 198/655 |

Primary Examiner—John J. Love
Assistant Examiner—Richard K. Thomson
Attorney, Agent, or Firm—Daniel P. Worth

[57] ABSTRACT

A coupling includes an outer cup-shaped member that acts as a support for other parts and is both revolvably and slidably supported on a conveyor that moves the coupling between work stations. In the normal installation, the coupling would move between workpiece loading and unloading stations. Slide motion relative to the conveyor is used to engage and disengage a workpiece. The outer cup-shaped member acts as a shield against ambient conditions which may include heating, coating or the like. The coupling preferably involves an internal chuck feature having an expandable resilient detent member preferably in the form of a metallic stretchable annular member known as a garter spring. The coupling and conveyor are suited for use in handling soft or easily marked materials such as plastic.

10 Claims, 3 Drawing Figures

FIG. 1
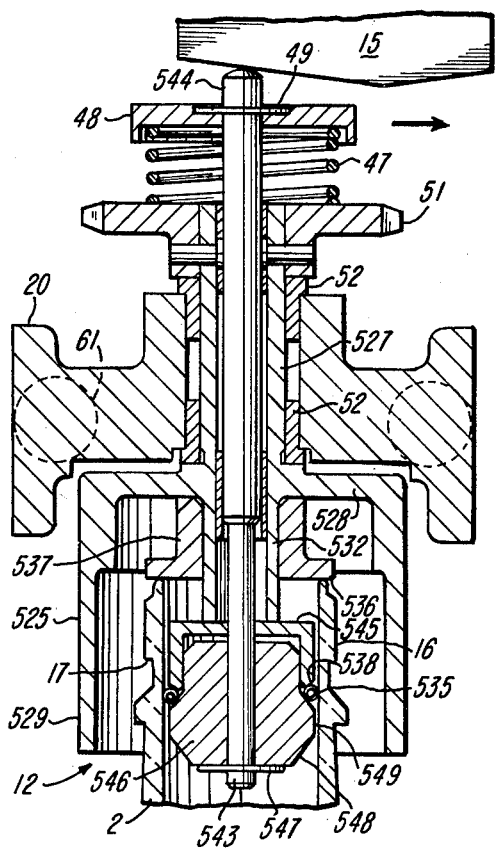
FIG. 2
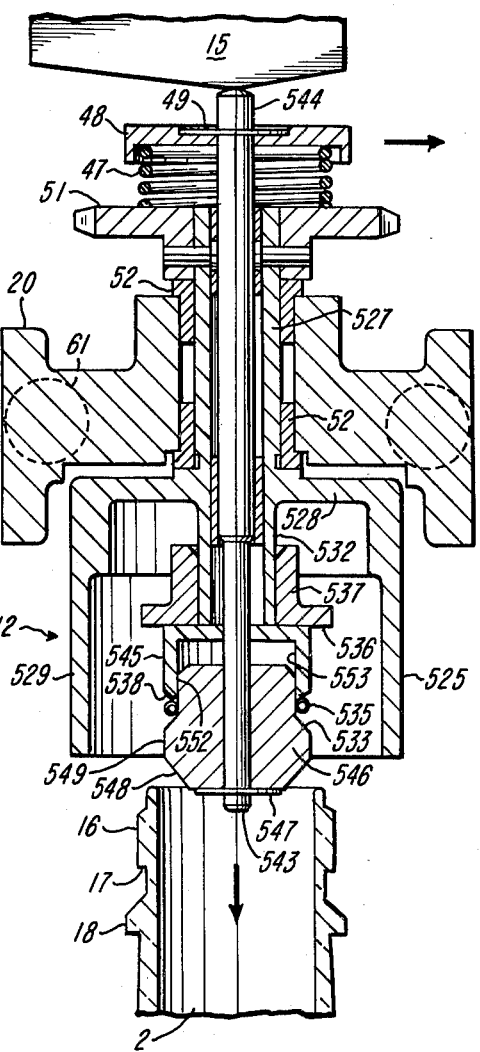
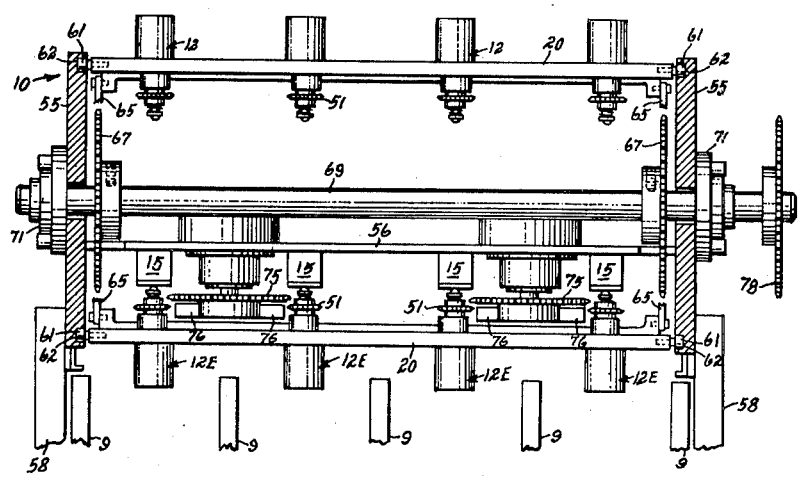
FIG. 3

CONVEYOR COMBINED WITH COUPLING

SUMMARY AND BACKGROUND OF INVENTION

This application is filed at the same time as a related application Ser. No. 796,847 by David Ian McDonald entitled CONVEYOR COMBINED WITH COUPLING FOR HANDLING WORKPIECE is filed. Said McDonald application is stated in its first paragraph to be a continuation-in-part of a co-pending application Ser. No. 668,323 filed March 18, 1976 by McDonald now abandoned.

The present application represents an improvement in the coupling and conveyor means described in said McDonald application and also described in U.S. Pat. No. 3,958,685 dated May 25, 1976 which patent is expressly incorporated herein in its entirety.

As explained in said patent, the present invention is particularly well adapted for conveying a thermoplastic preform through a processing means such as a coating system or, e.g., a preheating oven immediately before delivering the preform into a blow molding machine for making bottles. The preform ordinarily has a circular cross-section and is a hollow tubular member generally shaped like a test tube. The preheating process is required in order to adjust the temperature of a previously injection molded preform to the exact level required for blow molding to achieve biaxial orientation of the plastic. Plastics contemplated for use herewith include various thermoplastics such as the polyolefins including polyethylene and polypropylene, acrylonitrile, and a host of polyesters including polyethylene terethphalate and polybutylene terethphalate and the like.

The concurrently filed McDonald application and its parent application disclose a resilient detent member made of elastomeric material such as rubber or some other elastomeric either natural or synthetic. Operating experience has demonstrated that the elastomer works well but tends to harden after extended use. The hardening reduces the ability of the elastomer to expand and contract for engaging and disengaging the work.

The present invention has an objective of providing an improved coupling having a resilient detent that is capable of resisting heat, adverse atmosphere, and other ambient conditions. A specific objective of the present invention is to provide an improved coupling using a garter spring as the detent means.

The invention therefore includes an improved coupling assembly for use in combination with a conveyor means to form a machine that carries an elongated hollow workpiece between workstations which machine further includes conveyor means movably mounted relative to the base of the machine for supporting at least one such coupling for repeated movement therebetween and unloading and wherein the improved coupling comprises a carrier that is a part of the conveyor means; a support member having an upper stem portion and a lower portion, the upper portion being mounted on the carrier to revolve but not reciprocate relative to the carrier, the lower portion having internal shoulder means surrounded by a cup-shaped member, the cup being defined by an annular wall surrounding a chamber and an end wall supporting at least a portion of the internal shoulder means and connecting the stem portion to the annular wall and having an open end on the bottom of the cup opposite the end wall; a follower slidably supported in the stem portion and having the lower end of the follower substantially within the chamber, the follower being movable axially toward and away from the open end; and detent means comprising a resilient metallic annular member supported between the follower lower end and the support member and radially movable, respectively, in and out from the central portion of the chamber responsive to expansion and contraction respectively, from axial movement of the follower to respectively disengage and engage an internal annular portion of such workpiece.

Other objects, advantages and features of the invention will become apparent from a reading of the following disclosures in conjunction with the annexed drawings wherein:

FIGS. 1 and 2 are enlarged side cross-sections of a coupling according to the invention as mounted on a carrier bar in, respectively, a workpiece engaged and a workpiece releasing position; and FIG. 3 is a front view of a conveying means illustrating in particular a carrier bar to which is mounted a plurality of the instant couplings.

At the outset I wish to make clear that the present invention is a presently preferred improvement for use as the coupling 12 in the invention set forth in detail in the above U.S. Patent. For this reason, the description of the environment in which the present invention is used is omitted and the reader is referred to said U.S. patent therefor.

For purpose of explanation, the reader should assume that the invention is being used for conveying preforms 2 of polyethylene terathphalate which is already noted is a hollow tubular member bearing a resemblance to an test tube with an externally threaded open end. The preform or workpiece is carried by a conveyor means 10 (FIG. 3) while held or engaged by a coupling 12 constructed as in FIGS. 1 and 2. The coupling is continuously rotated during the time it moves between work stations and the conveyor — as described in said patent — is further constructed to provide for advancing the conveyor in predetermined straight line amounts between said work stations, arresting linear movement periodically, but meanwhile continuously twirling the same.

The preform 2 is held by the coupling assembly 12 constructed as in FIGS. 1 and 2. The coupling is manipulated by cam 15 or the like to move it as desired from the engaged position of FIG. 1 to the disengaged position of FIG. 2 and vice versa. As already explained, the coupling has to be moved to the FIG. 2 position in order to load it.

The preform 2 is an injection molded article of polyethylene terephthalate having threads 16 about its upper end for use in making a blow molded bottle. If not threaded, then a suitable closure engaging means is provided. The lower end of lip 16 terminates in a pilfer proof ring 17 which preferably is defined by an annular thickened area at the lowermost end of the threads or other closure means having a substantially right angle undercut region that connects directly to the support ring 18. The preform is hung from the support ring during manufacturing operations and on some occasions the region between rings 17 and 18 is used for external grabbing or support during manufacture and use (e.g. blowing and filling a bottle).

The preforms may be loaded by hand or machine into the couplings. The said U.S. Patent describes means for loading and unloading mechanically.

FIG. 3 hereof is an identical reproduction of FIG. 3 in said patent and illustrates how the present invention is incorporated into a conveyor means. Additional details as already noted are explained in said patent. The present FIG. 3 shows a conveyor means 10 that includes a plurality of the couplings 12 arranged in the rank and file sort of array described in detail in said patent. These couplings are illustrated as mounted four abreast on a carrier bar 20 which extends laterally of the machine. The carrier bar 20 in turn has rollers 61 on each end which engage and roll in tracks 62 which are formed in or upon the side plates 55 of the entire machine.

The follower is actuated by a cam 15 or the like which is mounted to strike the top of the follower 544 to cause it to assume the engaged or released position of FIGS. 1 and 2, as the case may be.

As further explained in said patent, a drag link 65 connects each carrier bar to a conveyor chain on each side of the conveyor. A plurality of bars 20 are provided one behind the other joined by links 65 to the conveyor chain which is wound around drive sprocket 67 and a similar idler sprocket at the opposite end of the machine. A pair of sprockets 67 and idler sprockets are provided at each end mounted laterally spaced apart on suitable shafts such as drive shaft 69 which in turn is mounted in suitable bearings 71 and receives power through a chain and sprocket drive at 78.

Reference Nos. 9 and 58 and other numbers in FIG. 3 represent correspondingly numbered pieces in said patent, namely oven 9 and machine legs 58.

Embodiments of FIGS. 1 and 2

The embodiment of FIGS. 1 and 2 differ from the prior art in having a garter spring 535 — or more broadly resilient metallic member 535 — as the resilient member which expands into engagement with the inside of the preform neck.

Part numbers for similar parts of FIGS. 1 and 2 are as used in the other embodiments (e.g. said patent and McDonald application) with the addition of a prefix in the 500 series, e.g. the follower is 544 and the cup is 525. Identical parts of assemblies continue to have the identical number as above or in the issued U.S. Pat. No. 3,958,685, e.g. carrier bar 20, carrier rollers 61, etc.

The coupling assembly 12 engages and releases the preform in a manner similar to that described for the prior art embodiments namely by a means for converting axial motion of the follower 544 to radial motion of an engaging member, here specifically to expand the resilient detent means 535 which is preferably a garter spring. Thus, the present embodiment operates similar to an internal chuck by axial compression and decompression of the resilient detent garter spring 535 to cause it to increase in diameter or decrease in diameter, as the case may be, to correspondingly engage and disengage the preform on its internal diameter.

Follower 544 is connected to the carrier, slidably supported in and passes through the hollow stem 527 of the cup 525 by an amount sufficient to engage an actuating means such as cam 15, and has a resilient biasing means such as helical spring 47 held in compression between the support stem 527 and the housing follower 544. The spring is retained on the follower by retaining ring and washers 48, 49 and biases the detent means 535 to within the support or cup-shaped member 525. That is, the helical springs 47 in the absence of cam actuation urges the instant coupling to the position shown in FIG. 1.

Coupling 12 comprises a first cup-shaped member 525 which is the outermost member and forms the support from which a hollow stem 527 rises upwardly. Cup 525 has a closed-end 528 supporting the hollow stem from which a skirt or tubular cylindrical wall 529 depends. The skirt depends far enough to act as a heat shield to protect the neck of the preform from the surrounding heating affects. The reason for this is to prevent distortion of the neck which must be maintained in a more or less exact dimension so that a closure can be applied thereto at a later point.

The preform is placed in the same position each time by seating it against preform seat 536 which is the lowermost face on the flanged bushing 537 that is slidably mounted on the depending internal annular shoulder 532. Alternatively, but less preferably, bushing 537 may slide on the follower and stop against an internal shoulder comprising the inside face of end 528, i.e. there is no shoulder extending from the cup end 528 to the open end. Abutting on shoulder 532 is an expander or a garter spring upper seat 545 which is a small cup-shaped member preferably formed with a tapered lower lip 538 and is slidably fitted on the lower end of the follower. Expander 545 has an outer diameter sufficient to guide the preform while the same is being moved in and out of engagement with the coupling and the cup bottom is in facial engagement with said shoulder and — in the FIG. 2 — with the seat 536. This tapered lip 538 is annular, has a taper that converges toward the open end of the chamber and acts as a wedge and anvil against which the resilient detent spring 535 is compressed and expanded by cam surfaces on nose 546. Thus, lip 538 and cam 533 are first and second wedge means.

Follower 544 is slidably mounted in the hollow stem 527 and has a lower end on which is slidably mounted the spring expanding nose 546. This nose is fitted slidably on the lowermost end of the follower and held there by a pin or retainer ring 547. This nose is circular in cross-section as are the other components of this coupling, has a tapered lowermost end 548 to guide the preform as it is loaded thereon, a cylindrical guide band 549 adjacent thereto and then a tapered spring expanding surface or cam surface 533. There is also a smaller diameter cylindrical surface 552 that slidably engages the interior 553 of inverted cup 545 so that the two cooperate readily.

The tapered surfaces 533, 538 comprise first and second wedge means that expand and contract spring 535 as they move together and move apart.

Each coupling 12 made according to FIGS. 1 and 2 operates thus: the workpiece 2 is initially loaded in or is released by depressing the follower 544 which compresses the holding spring 47 and moves the follower end 543 axially down toward the FIG. 2 position whereupon the detent 535 is allowed to and does radially contract or move radially inward thereby releasing the workpiece or presents a diameter readily insertable into the hollow parison neck. The parts at this time reach the FIG. 2 position and if a workpiece 2 is in the coupling 12 at beginning, it is released but if the coupling is empty it is loaded by inserting a workpiece 2 and moving it axially until the detents 535 engage it by ultimately assuming the FIG. 1 position. The holding function proceeds in substantially the reverse order of the steps first recited whereupon detent 535 expands radially to become fully engaged with the internal diameter of the preform as in FIG. 1. Movement of the coupling 12 away from the cam 15 causes the radial expansion of the garter spring 535 by allowing follower 544 to be moved up to FIG. 1 position under the bias of spring 47. Thus, relative axial motion between the follower 544 and cup 525 is converted into radial motion of the detent 535.

To minimize galling, the nose 546 is preferably of a hard brass and the expander 545 is of cold rolled or case hardened steel which has been surface treated, e.g. parkerized, to minimize or reduce rusting.

What is claimed is:

1. An improved coupling assembly for use in combination with a conveyor means to form a machine that carries an elongated hollow workpiece between workstations which machine further includes conveyor means movably mounted relative to the base of said machine for supporting at least one such coupling for repeated movement therebetween and unloading and wherein said improved coupling comprises -
   (a) a carrier that is a part of said conveyor means;
   (b) a support member having an upper stem portion and a lower portion, said upper portion being mounted on said carrier to revolve but not reciprocate relative to said carrier, said lower portion having internal shoulder means surrounded by a cup-shaped member, the cup being defined by an annular wall surrounding a chamber and an end wall supporting at least a portion of said internal shoulder means and connecting said stem portion to said annular wall and having an open end on the bottom of said cup opposite said end wall;
   (c) a follower slidably supported in said stem portion and having the lower end of said follower substantially within said chamber, said follower being movable axially toward and away from said open end; and
   (d) detent means comprising a resilient metallic annular member supported about said follower and between said follower lower end and said end wall and radially movable, respectively, in and out from the central portion of said chamber responsive to expansion and contraction respectively, from axial movement of said follower to respectively disengage and engage an internal annular portion of such workpiece 2. An improved coupling according to claim 1 wherein said detent means comprises a garter spring as said resilient metallic member and first and second wedge means disposed upon said follower lower end to engage said spring to so expand and contract it.

3. An improved coupling for use in combination with a conveyor means according to claim 1, which further includes a follower biasing means to urge same away from said open end.

4. An improved coupling according to claim 3 wherein said detent means comprises a garter spring as said resilient member, first and second annular wedge means to engage said spring from opposite sides to so expand and contract it, and wherein said shoulder means depends from said cup end wall and spaces one of said wedge means from said wall.

5. A machine that is a combination of a conveyor means and a plurality of couplings each for handling an elongated hollow workpiece by carrying same while twirling between workstations which machine further includes conveyor means movably mounted relative to the base of said machine for supporting a plurality of said couplings for repeated movement between said workstations to cause each coupling to engage and disengage a workpiece responsive to arriving, respectively, at one of said stations for and at another station for unloading comprising:
   a carrier means that is a part of said conveyor means; and wherein more than one of said couplings comprises
   a support member mounted on said carrier and having an upper stem portion and a lower portion, said upper portion being mounted on said carrier to revolve but not reciprocate relative to said carrier, said lower portion having internal shoulder means surrounded by a cup-shaped, structure defined by an annular wall surrounding a chamber, the cup being formed further by an end wall supporting said internal shoulder means within said chamber and connecting said stem to said side wall and having an open end opposite said end wall;
   a follower slidably supported in said stem portion and having the lower end of said follower substantially within said chamber said follower being movable axially toward and away from said open end;
   a detent means that includes a resilient metallic ring supported between said follower lower end and said support member and radially movable, respectively, in and out from the central portion of said chamber responsive to decompression and compression, respectively, from axial movement of said follower to engage an internal annular portion of such workpiece.

6. A machine according to claim 5 wherein each coupling has a means to resiliently bias same to a position for engaging a workpiece, and said conveyor means has a plurality of said carriers that supports said couplings in rank and file position.

7. A machine according to claim 6 wherein said resilient ring is a garter spring.

8. A machine according to claim 5 wherein said resilient ring is a garter spring.

9. A machine according to claim 5 wherein said detent means further comprises first and second wedge means between which said resilient ring is located, that move together responsive to axial movement of said follower to thereby expand said ring.

10. A machine according to claim 9 further comprising said internal shoulder means depending from said end wall toward said open end and both said wedge means disposed along said follower between said shoulder means and said open end.

* * * * *